United States Patent [19]
Rivelli et al.

[11] Patent Number: 5,254,246
[45] Date of Patent: Oct. 19, 1993

[54] WATER RECLAMATION SYSTEM

[76] Inventors: Sonia Rivelli, S&S Ranch, 7535 Valley Sage Rd., Acton, Calif. 93510; Jean Savoy, P.O. Box 557, Broussard, La. 70518; Geraldo R. Silveira, P.O. Box 557, Broussard, La. 70518; Gerard D. Klug, P.O. Box 557, Broussard, La. 70518

[21] Appl. No.: 730,433

[22] Filed: Jul. 16, 1991

[51] Int. Cl.$^5$ .......................... C02F 3/20; C02F 9/00
[52] U.S. Cl. .................. 210/195.4; 210/202; 210/259; 210/333.1; 210/335
[58] Field of Search .............. 210/620, 622, 631, 793, 210/798, 195.1, 195.4, 196, 202, 203, 205, 230, 258, 259, 295, 314, 333.1, 333.01, 335, 411, 748, 920; 210/920

[56] References Cited

U.S. PATENT DOCUMENTS

| | | | |
|---|---|---|---|
| 838,052 | 12/1906 | Pfautz | 210/335 |
| 3,306,447 | 2/1967 | Medeiros | 210/202 |
| 3,425,936 | 2/1969 | Culp | 210/622 |
| 3,666,106 | 5/1972 | Green | 210/748 |
| 3,709,364 | 1/1973 | Savage | 210/196 |
| 3,713,543 | 1/1973 | Heaney | 210/196 |
| 4,422,929 | 12/1983 | Owens | 210/202 |
| 4,505,813 | 3/1985 | Graves | 210/411 |
| 4,650,577 | 3/1987 | Hansel | 210/195.3 |
| 4,818,420 | 4/1989 | Mimis | 210/798 |

*Primary Examiner*—Christopher Upton
*Attorney, Agent, or Firm*—Allan M. Shapiro

[57] ABSTRACT

The water reclamation system receives waste water from a small residential type source, such as one or more homes, a series of apartments or road houses, and processes the water so that it meets the standards of state and federal regulatory agencies for non-domestic services. The treatment in accordance with the system starts with biologic and enzymatic treatment of the materials in the waste water stream. Next, bacteria is killed by chlorination. Thereafter, mechanical filtration improves clarity. Finally, ultraviolet treatment kills any remaining bacteria. The final flow is useful for irrigation, washing of structures and automobiles, filling swimming pools, and for returning to toilet tanks for flushing purposes. The system includes a provision for backwashing the filters.

7 Claims, 4 Drawing Sheets

WATER RECLAMATION SYSTEM

FIELD OF THE INVENTION

This invention is directed to a system which receives household type waste water and processes the waste water to a sufficient extent that it meets standards which permit the reuse of the water for non-domestic purposes.

BACKGROUND OF THE INVENTION

Water reclamation systems are well known and are usually large systems for large groups of homes, municipalities any larger groups. Such systems can be very sophisticated and treat the various impurities and contaminants in a municipal waste stream in various ways. While the output from such a waste water treatment plant can be very clean and pure, such is rarely piped back to the community. Occasionally, the reclaimed water is piped to a park or golf course for irrigation water, but such reclaimed water is almost never pumped back to the household for reuse. The result is use of a large amount of new water to meet all of the continuing water needs of a household. With a smaller, effective system, individual homes and small residential groups could conserve new water by reclaiming some of their waste water and using it for non-domestic purposes. Thus, there is need for a proper treatment system which can be operated on a smaller scale so that it is useful to individual homes and small residential groupings.

SUMMARY OF THE INVENTION

In order to aid in the understanding of this invention, it can be stated in essentially summary form that it is directed to a water reclamation system which is sized for individual residential home use or small residential home groupings and which is arranged for enzymatic and bacteriologic breakdown of larger molecules, followed by chemical bacteriological control, filtration and, finally, ultraviolet anti-bacterial processing to provide a purified stream suitable for non-domestic purposes.

It is thus an object and advantage of this invention to provide a water reclamation system which receives domestic waste water and which treats the stream to provide a purified stream suitable for most non-personal usage.

It is another object and advantage of this invention to provide a water reclamation system of sufficiently small size that it can be effectively supplied by a small waste water stream and provide a purified stream which meets all the discharge requirements of the Environmental Protection Agency, the United States Coast Guard, and other state and federal regulatory agencies It is another object and advantage of this invention to provide a water reclamation system which converts a domestic waste water stream to a purified stream with a minimum of operational attention so that unskilled persons can effectively operate the system.

It is a further object and advantage of this invention to provide a water reclamation system which is sufficiently simple that it can be inexpensively built, installed and operated so that it is practical for providing a purified stream which is useful for watering lawns, washing automobiles and the like.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 4 is a substantially vertical section through the clarifier filters of the system.

DESCRIPTION OF THE PREFERRED EMBODIMENT

Figure 1:
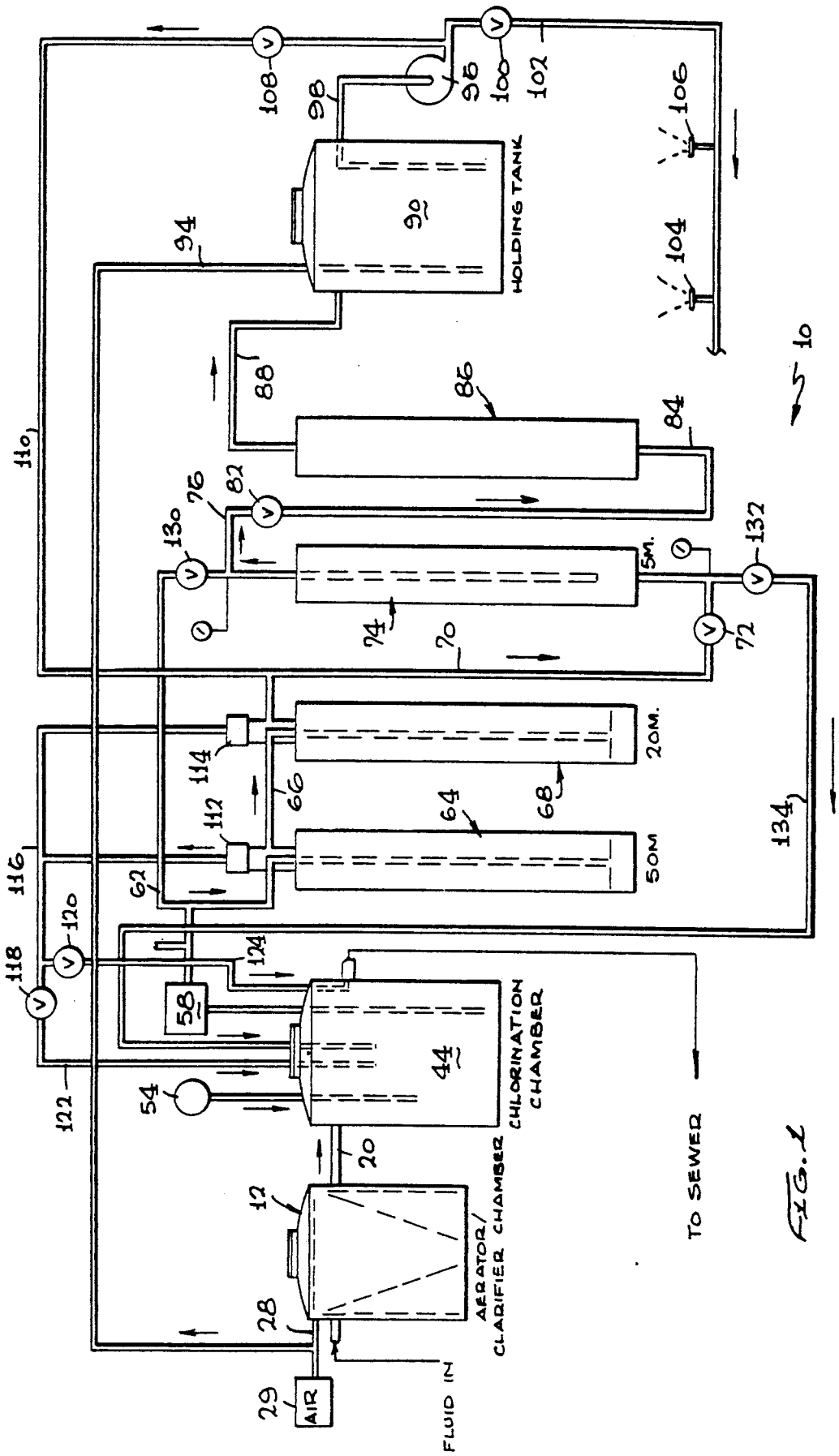
FIG. 1 is a schematic side-elevational view of the water reclamation system of this invention.

The water reclamation system of this invention is generally indicated at 10 in FIG. 1. The water reclamation system 10 covers the entire system from the household waste water inlet to the purified outlet stream suitable for irrigation use and the like. The system of FIG. 1 is conveniently divided into four functional parts for detailed understanding. Analyzing the system in the direction of principal fluid flow, the first is the aerator/clarifier chamber 12 which is shown in more detail in FIG. 2. The aerator/clarifier chamber 12 comprises a tank 14 with closed sides and bottom. Manhole 16 is provided at the top to furnish access for the original manufacturing and for maintenance. Manhole cover 18 is bolted onto the manhole ring to close the top of the tank. Inlet pipe 20 brings in the household liquid waste. The inlet pipe 20 comes from showers, sinks, baths, dishwashing machines, clothes washing machines, lavatories and toilets. The waste flow is principally water which is high in soaps and detergents. There is some organic waste. The waste flows by gravity into tank 14 of the aerator/clarifier chamber 12 where it mixes with the mostly water liquid material therein. The liquid level in tank 14 is determined by the level of outlet pipe 22, which has a tee 24 at its inlet end and a tee 26 therebelow so that outlet liquid is taken below the surface of liquid in the tank 14.

Figure 2:
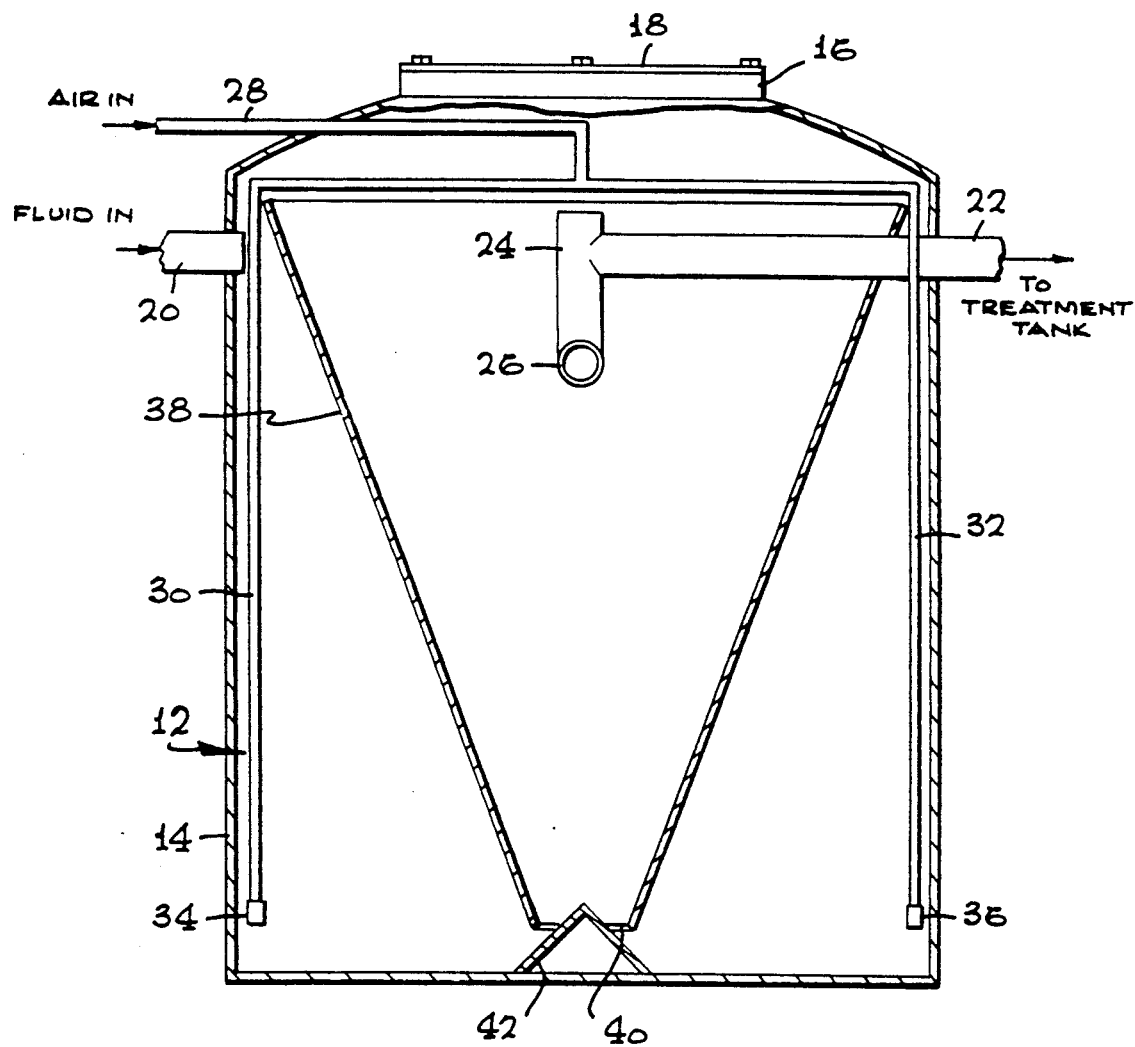
FIG. 2 is a substantially center-line section through the aerator/clarifier chamber of the system.

Treatment in the aerator/clarifier chamber 12 is aerobic. Oxygen is supplied by air inlet line 28, which is supplied with an adequate amount of air under pressure from air source 29 to cause aeration of the liquid in chamber 12. The air inlet line is divided into a plurality of diffuser lines. Diffuser lines 30 and 32 are shown in FIG. 2. The number of diffuser lines is a function of the size of the tank. Each diffuser line carries a diffuser on the lower end thereof about 6 inches from the bottom of tank 14. Diffusers 34 and 36 are respectively on the bottom of diffuser lines 30 and 32.

The aerator/clarifier chamber 12 is separated into an outer aerator chamber and an inner clarifier chamber by means of a truncated clarifier cone 38. The waste water inlet pipe 20 is exteriorly of the clarifier cone, while the outlet tees 24 and 26 are interiorly of the cone. Thus, most solids activity occurs exteriorly of the cone, and the aeration is exteriorly of the cone. Therefore, there is more stirring exteriorly of the cone with the air bubbling up. Interiorly of the cone, there is less stirring so that the heavier solids settle out. Clarifier cone 38 has a bottom outlet 40 down through which the heavier solids settle. This bottom outlet 40 is also the inlet for the generally upward flow of liquid. At the bottom outlet, conical sludge deflector 42 is secured to the bottom of the tank 14 in order to spread the descending sludge. The air diffusers provide air bubbles rising in the main aeration chamber exteriorly of the clarifier cone to provide the oxygen that is required for biological reduction of the organic components of the waste stream. The bubbling up of the air bubbles causes the stirring in the aeration chamber which enhances the biological activity. In order to provide the proper enzymatic and bacterial action to break down the organics in the waste stream, a mixture of materials specifically intended for that purpose is introduced. A suitable mixture is commercially available in "Enviro-Zyme OBT." The introduced materials are environmentally safe and consist primarily of bacteria, some of which produce enzymes for breaking down the longer chain molecules and some bacteria are active in reducing the organics to carbon dioxide and water. The active materials may include a broad spectrum amylase producer to break down carbohydrates and starches, a strain selected for production of extra-cellular protease which breaks down proteins, a high cellulase and lipolytic enzyme producer to break down cellulose, waxes, fats and glycolipids, a lipase-producing bacteria for breaking down grease, animal fats and vegetable oils, another lipase-producing bacteria specifically for hydrocarbon reduction, two bacterial strains capable of degrading grease and hydrocarbons, and one bacterial strain for degradation of detergents. Under ideal conditions, these bacteria will reproduce every 20 minutes. The growth rate is dependent on several factors such as food source, density, temperature, oxygen and water. If the bacteria are left over a long period without the introduction of new bacterial cultures, one of the strains will become dominant over the remaining. If this occurs in the aerator/clarifier chamber, some types of waste will not be reduced in the proper manner because the bacteria needed for that particular kind of waste would not be in the necessary supply. Thus, regular applications of the active material are necessary to maintain the effectiveness of the system. In addition to the breaking down of the incoming organic materials, the active materials keep the incoming lines, the aerator/clarifier chamber surfaces and the outlet line 22 free of organic materials. In order to maintain the bacteriological activity, strong acids, caustics, chlorine and ammonia should not be introduced into the system. They would be harmful to the bacteria which are necessary for proper action.

The result of proper bacterial action, including enzymatic action resulting from bacteriological function is bringing the biochemical oxygen demand (BOD) below twenty parts per million. The clarifier chamber within the clarifier cone permits settling out of the heavier material so that the total suspended solids (TSS) at the outlet is below twenty parts per million. With the proper bacterial activity and the proper flow rate of inlet waste water and inlet air, such values can be achieved. Proper aeration of the aerator/clarifier chamber is necessary for the aerobic bacteria to thrive. The pH of the inlet waste water stream should be between 6 and 9 to maintain viable bacteria. In addition, the temperature range is preferably between 70 degrees and 100 degrees F. Below 40 degrees F. there will be no bacterial activity; and above 120 degrees F, the bacteria will begin to die.

The outlet stream in line 22 from the aerator/clarifier chamber contains bacteria. In order to kill the bacteria, chlorinator chamber 44 is provided, see FIG. 3. The chlorinator chamber 44 comprises a tank 46 which receives its liquid at inlet line 22. Liquid level in the tank 46 is controlled by gravity discharge out through outlet line 48, which is a gravitational discharge to the sewer. Normal liquid level is below the overflow outlet line 48 to the sewer, as described below. Tank 46 is closed at the top with a manhole 50 and manhole cover 52. The cover is normally tightly fitting and is provided for manufacturing and maintenance access. Chlorine source 54 provides the chlorine to disinfect the liquid in tank 46. The chlorine source discharges chlorine through chlorine line 56 into the tank 46. The preferred source of chlorine is liquid sodium hypochlorite. Another chlorine source is dry calcium hypochlorite mixed with water, but only the water solution is used because calcium hypochlorite leaves a water-insoluble sludge that need not go into the system. The rate of introduction of chlorine into the chlorinator chamber 44 is suitably controlled so that all bacteria is killed. The chlorine inlet line 56 is shown as terminating near the top of the chamber because the preferred material, liquid sodium hypochlorite, has a density greater than water and tends to go to the bottom of the tank 46. By discharging the chlorine-containing liquid near the top of the tank, it provides for some stirring as the sodium hypochlorite descends. In this manner, the chlorination chamber 44 is an environment in which all of the bacteria are killed so that the outlet liquid is free of biological activity. In order for the disinfection process to be effective, two process conditions must be satisfied. First, enough disinfectant must be injected into the chlorinator chamber to kill the bacteria. Second, enough time must be provided for mixing of the disinfectant with the effluent from the clarifier. If inadequate contact time is provided, bacteria may be passed on through the chlorinator chamber without coming into contact with the chlorine disinfectant. The chlorinator chamber is sized to provide at least 15 minutes retention time at three times the average flow rate. Testing may be performed to determine the adequacy of disinfection at the outlet of the chlorinator chamber.

The liquid is withdrawn from the chlorination chamber by pump 58, see FIG. 4, which has its suction line 60 extending into the chlorination chamber with the suction close to the bottom of the chamber. The pump 58 may be operated by a float or other level sensor in the chlorination chamber to avoid overflow out through the sewer outlet line 48. Pump 58 may be a jet pump or other suitable pump. Pump 58 provides pressurized water flow in pump discharge pressure line 62. Pressure is necessary to force the liquid through the filters to improve clarity. Filter 64 is a 50 micron filter designed to remove solids larger than 50 microns. It is preferably a multi-layer, multi-media filter. Transfer line 66 delivers the output of filter 64 to the inlet of 20 micron filter 68. The outlet of filter 68 passes through transfer line 70 and normally open valve 72 into 5-micron filter 74. Each of the series of filters is a tubular element liquid strainer constructed of stainless steel, and each is capable of removing suspended solids larger than the indicated strainer value so that the liquid in filter outlet line 76 is free of suspended solids larger than 5-microns. Each of the filters include a corrosion-resistant element which effectively retards plugging of the openings. Each strainer is designed for fast, efficient, in-place backwash cleaning without dismantling. The filters 64 and 68 have lower chambers 78 and 80 which contain activated charcoal, which removes objectionable odor and color by absorption from the disinfected water stream. The filtered water in filter outlet line 76 passes through normally open valve 82 and through line 84 to the next treatment stage.

Figure 5:
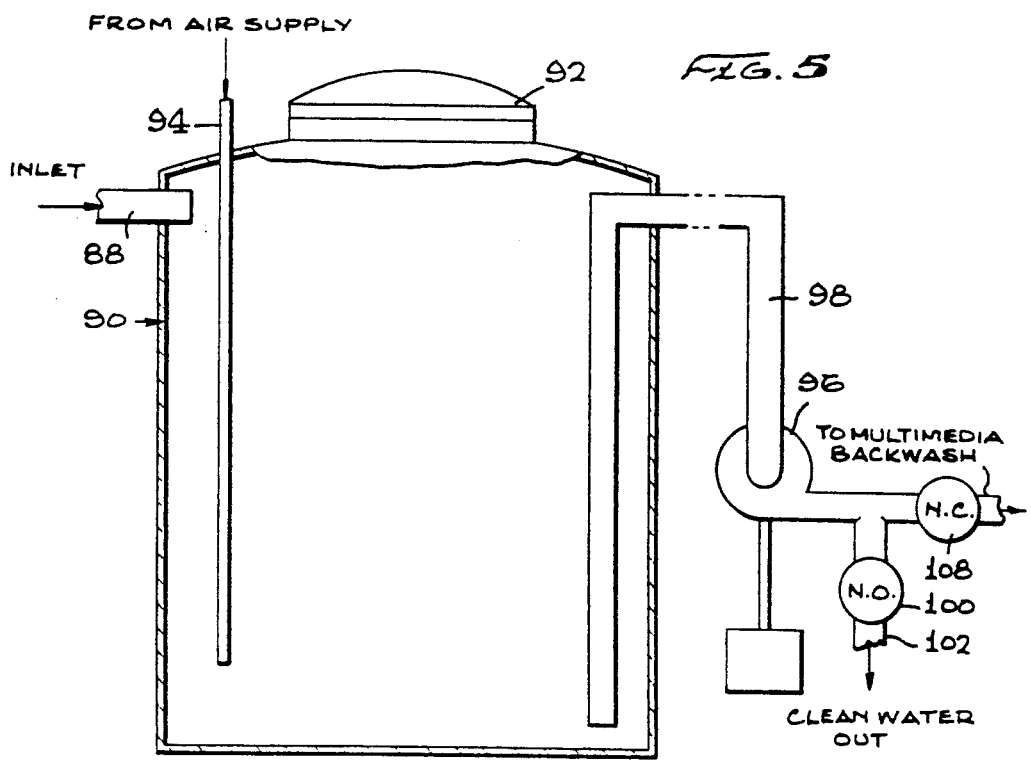
FIG. 5 is a substantially vertical section through the holding tank of the system.
Figure 9:
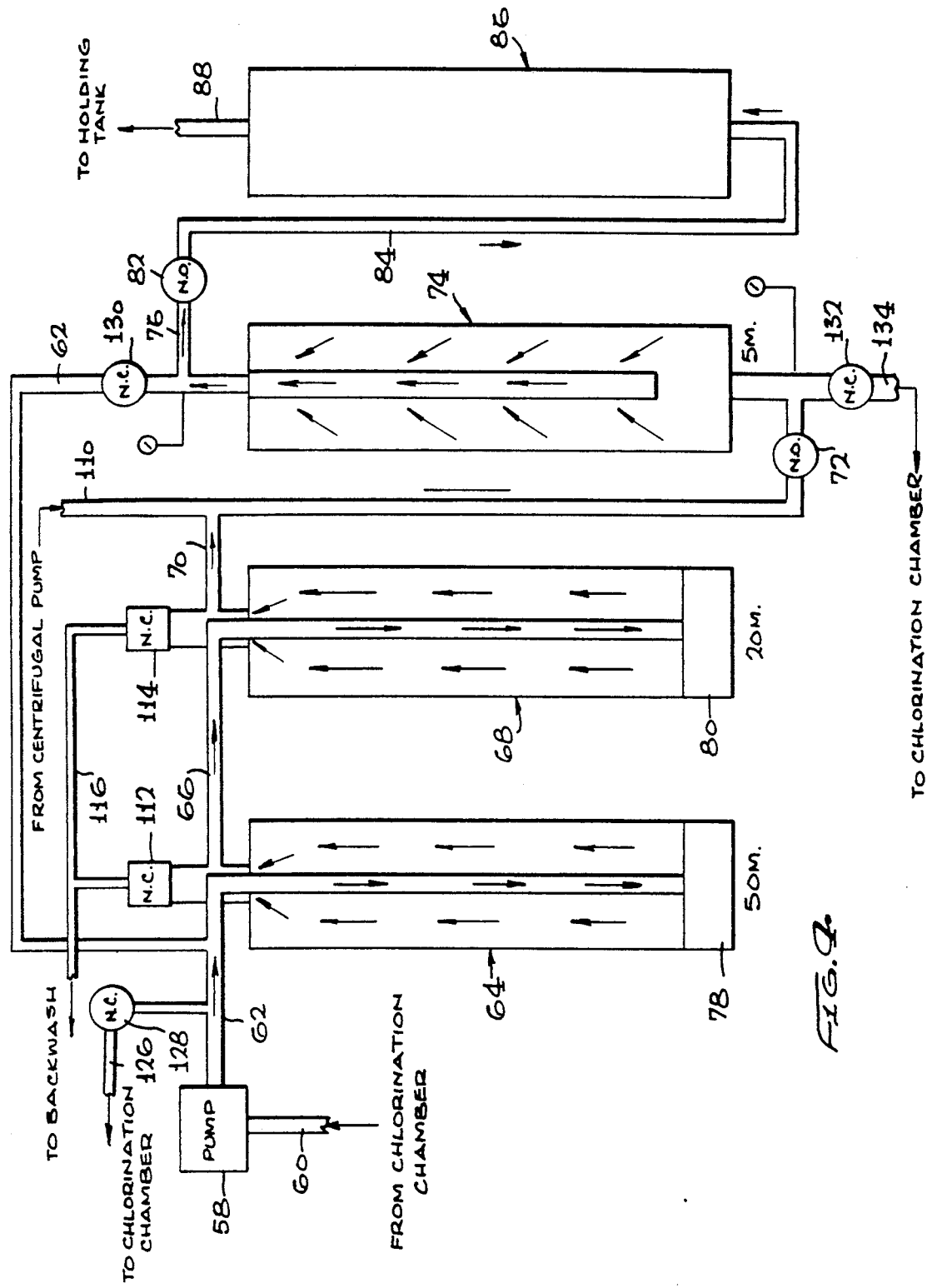

Natural water can contain a large variety of living organisms. Some are helpful, most are harmless, but some cause diseases such as cholera, dysentery and typhoid fever. It is because of this danger that all water with which humans might have direct contact must be thoroughly disinfected. The water in line 84 has already been chlorinated and filtered, but to be assured that there is no harmful bacteria, the water in line 84 passes through ultraviolet sterilizer 86 for final and complete sterilization. The sterile water passes out through outlet line 88 to holding tank 90, which is seen in FIG. 5. Holding tank 90 is a closed vessel having a manhole and manhole cover 92. It is simply present to provide a reservoir of reclaimed water for use. In order to maintain some water in holding tank 90, a float therein can actuate the pump 58 to deliver water through the filtration and sterilization system so that there is water for utilization in the holding tank 90.

In order to make the reclaimed water in holding tank 90 suitable for irrigation, it is aerated through aeration line 94. Pump 96 draws water through suction line 98, which delivers pressurized reclaimed water through normally open valve 100 to utilization line 102. FIGURE 1 shows the utilization line 102 supplying water to lawn sprinklers 104 and 106. In addition to or alternatively to the delivery to the sprinklers, the reclaimed water can be delivered to a hose bib for washing down sidewalks, washing cars, or for filling a swimming pool. Furthermore, the utilization line can be connected to fill toilet tanks. The reclaimed water is useful for any purpose except direct personal use such as showering, washing, bathing, drinking, or cooking. In this way, the household water is reclaimed and reused.

Figure 3:
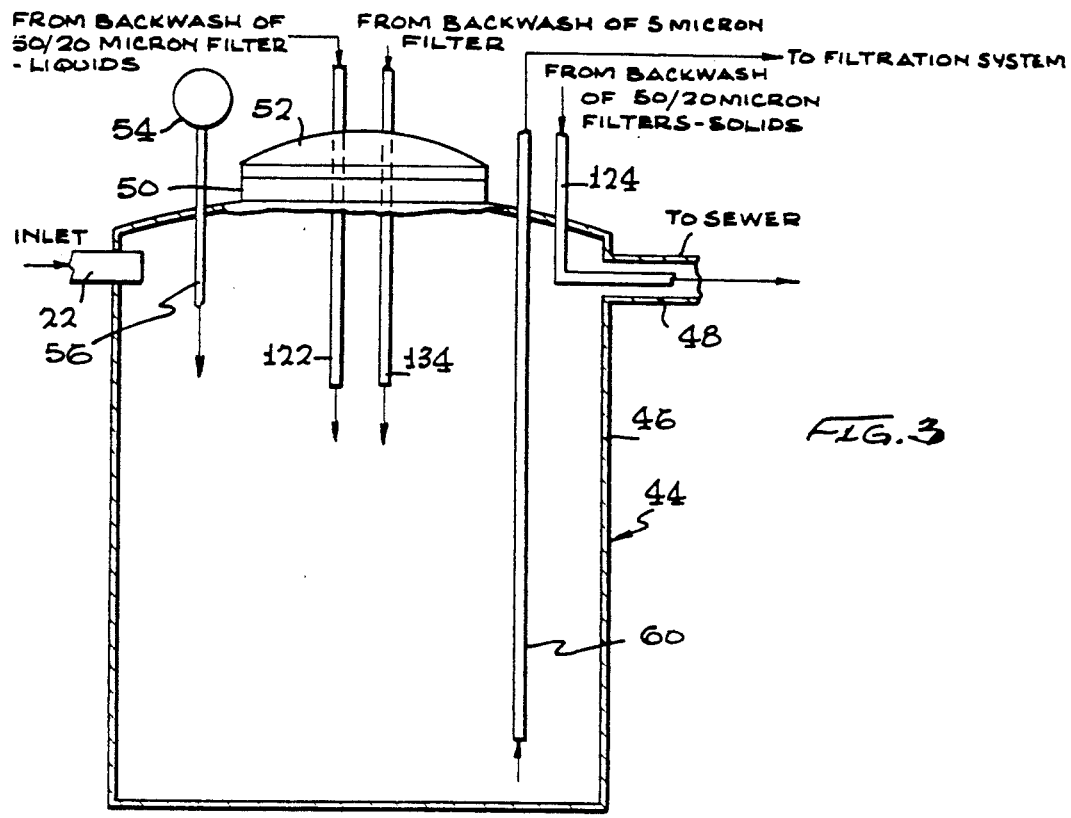
FIG. 3 is a substantially center-line vertical section through the chlorinator chamber of the system.

The filters 64, 68 and 74 are mechanical filters which need to be backwashed to maintain their filtration efficiency and to dispose of the solids which are packed onto the filter screens. To accomplish backwashing of filters 64 and 68, the pump 96 is turned on, normally open valve 100 is closed, and normally closed backwash valve 108 is opened. This delivers pressurized water into backwash pressure line 110, which connects to line 70. During backwash, normally open valve 72 is closed so that backwash water is delivered to the top of filter 68 and backwards through line 66 to the top of filter 64. Valves 112 and 114 on the tops of filters 64 and 68 are normally closed. During backwash operations, they are opened so that the backwash flow of dirty water from these filters is delivered through backwash drain line 116. Drain line 116 has normally open drain line valve 118 and normally closed drain line valve 120 therein, see FIG. 1. As shown in FIGS. 1 and 3, the drain line valve 118 delivers backwash waste water through line 122 to chlorinator chamber 44, and when these valves are reversed, the now open valve 120 delivers water through drain line 124 to the sewer, see FIG. 3. During the early part of the backwash when the backwash water is most contaminated with solids, this water is delivered to the sewer. After most of the solids have been backwashed into the sewer, the valves 118 and 120 are reversed so that the remainder of the backwash flow with a small amount of suspended solids is delivered to the chlorinator chamber 44. Another circuit related to the chlorination chamber is recirculating line 126, see FIG. 4, which is connected to pump discharge pressure line 62 through recirculating valve 128 so that, when this valve is open, the pump 58 circulates water through the chlorination chamber to keep it properly stirred to enhance sterilization.

The 5-micron filter 74 is backwashed by means of pump 58. The output line 62 of pump 58 is also connected to the top of 5-micron filter 74 by means of normally closed valve 130. The bottom of 5-micron filter 74 is connected through normally closed valve 132 in line 134 back to the chlorinator chamber. During backwash of the 5-micron filter, normally open valves 72 and 82 are closed, and normally closed valves 130 and 132 are open. This passes treated water from the chlorinator chamber in the reverse direction through the 5-micron filter and back to the chlorinator chamber. The backwash system is preferably automatically controlled by measuring the pressure drop on the filters. Since the 5-micron filter backwash is separate from the backwash of the other filters, it can have a separate sensor and a separate cycle. Automatic controls for the chlorine dispensing and backwash can be provided so as to minimize the operational effort required. Furthermore, automatic testing can be employed to assure continued safety in operation.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A water reclamation system for reclaiming a waste water stream comprising:

an aerator/clarifier chamber, a baffle in said chamber to divide said chamber into an aeration chamber and a clarifier chamber, a connection on said aerator/clarifier chamber for receiving household waste water into said aeration chamber, an air diffuser within said aeration chamber so that aerobic bacterial digestion in said aeration chamber breaks down waste in the waste water stream, said clarifier baffle having an opening adjacent the lower end thereof so that waste water passes the lower portion of said baffle and rises in said clarification chamber so that gravitational separation of heavy particles occurs, an outlet from said clarifier chamber to pass clarified water out of said clarifier chamber;

a sterilizer treatment tank, inlet means on said sterilizer treatment tank to receive waste water from said clarifier chamber outlet, means for introducing a sterilizer into said sterilizer treatment tank so that bacteria are killed therein to provide a digested, sterilized waste water stream;

a pump to pump sterilizer water from said sterilizer treatment tank;

at least two filters serially connected to receive water from said pump, said two filters serially removing smaller particles from the waste water stream, said filters being serially connected to a holding tank for holding sterilized and filtered water for reuse; and means for backwashing said serial filters, said means for backwashing including means for backwashing one of said filters with water from said sterilizer treatment tank and returning the backwash water to said sterilizer treatment tank and for backwashing the other of said filters with reclaimed water from said holding tank and returning at least part of said water to said sterilizer treatment tank.

2. The water reclamation system of claim 1 wherein there are first, second and third filters with said first and second filters being connected to be backwashed with reclaimed water from said holding tank.

3. The water reclamation system of claim 2 wherein there is also a sewer connection and at least one of said first and second filters is connected to selectively discharge backwash water to said sterilizer tank or to said sewer so that heavy material in backwash water can be discharged to the sewer and the principal amount of water can be discharged to said sterilizer treatment tank.

4. The water reclamation system of claim 3 wherein said third filter is connected to be backwashed with water from said sterilizer treatment tank and is connected to discharge backwash water from said third filter to said sterilizer treatment tank.

5. The water reclamation system of claim 4 further including an ultraviolet water sterilizer connected between said filters and said reclaimed water holding tank.

6. A water reclamation system for reclaiming a waste water stream comprising:

an aerator/clarifier chamber, a baffle in said chamber to divide said chamber into an aeration chamber and a clarified chamber, a connection on said aerator/clarifier chamber for receiving household waste water into said aeration chamber, an air diffuser within said aeration chamber so that aerobic bacterial digestion in said aeration chamber breaks down waste in the waste water stream, said clarified baffle having an opening adjacent the lower end thereof so that waste water passes the lower portion of said baffle and rises in said clarification chamber so that gravitational separation of heavy particles occurs, an outlet from said clarifier chamber to pass clarified water out of said clarifier chamber;

a sterilizer treatment tank, inlet means on said sterilizer treatment tank to receive waste water from said clarified chamber outlet, means or introducing a sterilizer into said sterilizer treatment tank so that bacteria are killed therein to provide a digested, sterilized waste water stream;

a pump to pump sterilizer water from said sterilizer treatment tank;

at least two filters serially connected to receive water from said pump, said two filters serially removing smaller particles from the waste water stream;

a holding tank, said filters being serially connected to said holding tank for holding sterilized and filtered water for reuse;

an ultraviolet water sterilizer connected between said filters and said reclaimed water holding tank; and means for backwashing said serial filters, said means for backwashing including means for backwashing one of said filters with water from said sterilizer treatment tank and returning the backwash water to said sterilizer treatment tank and for backwashing the other of said filters with reclaimed water from said holding tank and returning at least part of said water to said sterilizer treatment tank.

7. The water reclamation system of claim 6 to receive suction from said reclaimed water holding tank for discharging reclaimed water to use, said service pump being connected to supply backwash water to said filters for backwashing said filters.

* * * * *